United States Patent Office 2,822,318
Patented Feb. 4, 1958

2,822,318
PRODUCTION OF 3-KETO-$\Delta^{1,4}$ PREGNADIENES BY BACTERIUM CYCLO-OXYDANS Helen A. Kroll, New Brunswick, Joseph F. Pagano, Bound Brook, and Richard W. Thoma, Somerville, N. J., assignors to Olin Mathieson Chemical Corporation, New York, N. Y., a corporation of Virginia No Drawing. Application December 7, 1956
Serial No. 626,815

7 Claims. (Cl. 195—51)

This invention relates to, and has for its object the provision of, highly advantageous methods of producing 1-dehydrosteroids of the pregnadiene series. These derivatives are known compounds which are either physiologically active or are useful in the preparation of physiologically active steroids by methods known in the art.

It has been found that hydroxylated steroids of the 3-keto-$\Delta^4$-pregnene series (especially hydroxylated $\Delta^4$-pregnene-3,20-diones) can be converted to their corresponding $\Delta^{1,4}$-pregnadiene derivatives by subjecting the former to the action of enzymes of a new species of bacteria, hereinafter referred to as *Bacterium cyclo-oxydans*. The action of the enzymes can be utilized either by bringing together, in an aqueous nutrient medium, the steroid, oxygen and enzymes or non-proliferating cells of *Bacterium cyclo-oxydans*, or (preferably) by including the steroid in an aerated culture of *Bacterium cyclo-oxydans*.

The new species *Bacterium cyclo-oxydans* of this invention has been deposited with the American Type Culture Collection, Washington, D. C., wherein it has been given the identification number 12,673 and from whence it is available to the public. Of all known, classified bacteria, *Bacterium cyclo-oxydans* most closely resembles *Bacterium zenkeri* from which it can be distinguished as shown in the following table:

| Bacterium cyclo-oxydans | Bacterium zenkeri |
|---|---|
| Does not occur in chains. | Occurs in chains. |
| Liquefies gelatin. | Does not liquefy gelatin. |
| Litmus reduced and milk proteolyzed. | No change in litmus milk. |
| Scant, yellowish-gray growth on potato. | Good, white growth on potato. |
| Thin, bluish-gray growth on agar slants. | Good, white growth on agar slants. |

*Bacterium cyclo-oxydans* can be further characterized by the properties summarized in the following table:

Rods: 0.5 to 0.8 by 1.0 to 2.0 microns, not occurring in chains, formed after two days of incubation on a nutrient agar slant. Motile. Gram-positive or gram-variable. Not acid-fast. Non-sporulating.

Potato slant: Good, smooth, glistening, translucent, white growth.

Bennett's agar (yeast extract, 1 g.; beef extract, 1 g.; NZ Amine A, 2 g.; glucose, 10 g.; agar, 15 g.; 1 liter distilled water. pH 7.3): Abundant, smooth, glistening, flat, opaque, white growth. Individual colonies small with arborescent edge.

Nutrient agar (beef extract, 3 g.; peptone, 5 g.; NaCl, 8 g.; agar, 15 g.; 1 liter distilled water. pH 7.3): Good, smooth, flat, translucent, white growth. Streak filiform.

Nutrient broth (beef extract, 3 g.; peptone, 5 g.; 1 liter distilled water. pH 6.8): No surface growth. Small amount of compact white sediment. Slightly turbid.

Gould agar (glucose, 10 g.; yeast extract, 2.5 g.; $K_2HPO_4$, 1 g.; agar, 20 g.; 1 liter distilled water): Abundant, glistening, smooth, flat, translucent, white growth. Streak filiform.

Litmus milk: No change after one week at 25° C. After several weeks, litmus reduced and proteolysis.

Gelatin: Partially liquefied after one week at 25° C. Totally liquefied after two weeks.

Starch: No hydrolysis.

Good growth on Gould agar at 25° C., 30° C. and 37° C.

No tyrosine decomposition.

No nitrate reduction.

No hydrogen sulfide production.

No indole production.

No acid or gas from common sugars and sugar alcohols (e. g., glucose, lactose, sucrose, maltose and mannitol).

In general, the conditions of culturing *Bacterium cyclo-oxydans* for the purposes of this invention are (except for the inclusion of the steroid to be dehydrogenated) the same as those of culturing bacteria for the production of antibiotics or vitamins, e. g. bacitracin or vitamin $B_{12}$; thus, *Bacterium cyclo-oxydans* is grown in contact with (in or on) a suitable nutrient medium in the presence of oxygen (air). A suitable nutrient medium essentially comprises a source of nitrogenous factors and an assimilable source of carbon and energy. The latter may be a carbohydrate (such as sucrose, molasses, glucose, maltose, starch or dextrin) and/or the steroid itself. Preferably, however, the medium includes an assimilable source of carbon and energy in addition to the steroid.

The source of nitrogenous factors may be organic (e. g., soybean meal, corn steep liquor, meat extract, distillers solubles, peptones and/or yeast extract) or synthetic (i. e., composed of simple, synthesizable organic and inorganic compounds such as ammonium salts, alkali nitrates, amino acids or urea).

Among the hydroxylated steroids of the 3-keto-$\Delta^4$-pregnene-series which may be converted into useful 1-dehydro derivatives by the practice of this invention may be mentioned monohydroxyprogesterones (e. g., 11$\alpha$-hydroxyprogesterone, the 9$\alpha$- and 12$\alpha$-halo-11$\beta$-hydroxyprogesterones, desoxycorticosterone and 21-fluoro-17$\alpha$-hydroxyprogesterone); the dihydroxyprogesterones (e. g., corticosterone, the 9$\alpha$- and 12$\alpha$-halocorticosterone. Reichstein's Compound S, 11$\beta$-17$\alpha$-dihydroxyprogesterone, cortisone, the 9$\alpha$- and 12$\alpha$-halocortisones, 21-fluoro-11$\beta$,17$\alpha$-dihydroxyprogesterone and 9,21-difluoro-11$\beta$,17$\alpha$-dihydroxyprogesterone); the trihydroxyprogesterones (e. g., hydrocortisone, $\Delta^4$-pregnene-11$\alpha$,17$\alpha$,21-triol-3,20-dione and the 9$\alpha$- and 12$\alpha$-halohydrocortisones); and the tetrahydroxyprogesterones (e. g., 9$\alpha$-fluoro-16$\alpha$-hydroxyhydrocortisone); as well as the 21-ester derivatives of those steroids containing a 21-hydroxyl group (e. g., Compound S acetate, hydrocortisone 21-acetate, 9$\alpha$-fluorohydrocortisone 21-acetate and 9$\alpha$-fluorocortisone 21-acetate). The preferred 21-esters are those of hydrocarbon carboxylic acids having less than ten carbon atoms as exemplified by the lower fatty acids (e. g., acetic and propionic acids), the monocyclic aryl carboxylic acids (e. g., benzoic and $\alpha$-toluic acids), the monocyclic aryl lower alkanoic acids (e. g., phenacetic and $\beta$-phenylpropionic acids), the cycloalkane carboxylic acids and the cycloalkene carboxylic acids.

The following examples are illustrative of the invention (all temperatures being in centigrade):

EXAMPLE 1

$\Delta^{1,4}$-pregnadiene-11$\alpha$-ol-3,20-dione (a) *Fermentation.*—Surface growth from a three-day-old agar slant (beef extract 1.5 g., yeast extract 3 g., peptone 6 g., dextrose 1 g., agar 20 g., distilled water to 1 liter) culture of *Bacterium cyclo-oxydans* A. T. C. C. No. 12,673 (obtainable from the American Type Culture Collection, Washington, D. C.) is suspended in 5 ml. of sterile physiological saline solution. One-ml. portions of the suspension are used to inoculate four 50-ml. portions of the following medium contained in 250-ml. conical flasks:

| | |
|---|---|
| Glucose | g-- 20 |
| Peptone | g-- 5 |
| Tryptone | g-- 5 |
| Yeast extract | g-- 5 |
| $CaCO_3$ | percent-- 0.25 |

Distilled water to make one liter.

The inoculated flasks are incubated at 25° with rotary shaking at 280 cycles per minute in a radius of about 2 inches. After 19 hours, a 6% (vol./vol.) transfer is made to 1950 ml. of the following medium contained in thirty-nine 250-ml. conical flasks:

| | |
|---|---|
| Yeast extract | g-- 1.0 |
| Glucose | g-- 1.0 |
| $KH_2PO_4$ | g-- 1.0 |

Distilled water to 1 liter.
pH to 7.0 with 10% NaOH.
Autoclave at 120° C. for 20 minutes.

Incubation is continued as described above for 24 hours, when an aliquot of a solution of 488 mg. of 11α-hydroxyprogesterone in 19.5 ml. of absolute methanol is added in 0.5-ml. portions to each of the flasks. Three hours after the steroid is added, the contents of the flasks are pooled, the pH is adjusted from 6.7 to about 3 with 12 N sulfuric acid, the whole broth pool is heated in flowing steam for 15 minutes and filtered hot through a Seitz clarifying pad. Flasks, pad and cells are washed with four 50-ml. portions of hot water. The total volume of filtrate and washings is about 1900 ml. Paper chromatographic analysis reveals that the substrate has been completely utilized and that two major products have been formed.

(b) *Isolation of $\Delta^{1,4}$-pregnadiene-11α-ol-3,20-dione and $\Delta^{1,4}$-pregnadiene-11α,20β-diol-3-one.*—The combined filtrate and wash (about 1900 ml.) is extracted with four 600-ml. portions of chloroform and the chloroform is evaporated to dryness. The residue (about 540 mg.) appears, on paper chromatograms, to contain about equal amounts of $\Delta^{1,4}$-pregnadiene-11α-ol-3,20-dione and a more polar fraction. Fractional crystallization from acetone yields two pure compounds. The less polar compound is $\Delta^{1,4}$-pregnadiene-11α-ol-3,20-dione and, after additional crystallization from 95% ethanol, has the following properties: M. P. about 228–230°; $[\alpha]_D^{23}+93°$ (0.43 in chloroform);

$\lambda_{max.}^{alc.}$ 246 mμ ($\epsilon=18,100$); $\lambda_{max}^{Nujol}$ 2.94μ,
5.89μ, 6.05μ, 6.19μ, 6.28μ

*Analysis.*—Calcd. for $C_{21}H_{28}O_3$ (328.44); C, 76.79; H, 8.59. Found: C, 77.05; H, 8.36.

The more polar substance, identified as $\Delta^{1,4}$-pregnadiene-11α,20β-diol-3-one, after recrystallization from acetone, has the following properties: M. P. about 227–229°; $[\alpha]_D^{23}+41°$ (0.52 in chloroform);

$\lambda_{max.}^{alc.}$ 247 mμ ($\epsilon=18,400$)

*Analysis.*—Calcd. for $C_{21}H_{30}O_3$ (330.46): C, 76.32; H, 9.15. Found: C, 76.71, H, 8.68.

EXAMPLE 2

$\Delta^{1,4}$-*pregnadiene-11β,17α,21-triol-3,20-dione*

(a) *Fermentation.*—Following the procedure of section (a) of Example 1, but substituting hydrocortisone for the 11α-hydroxyprogesterone, there is obtained a filtrate containing 1-dehydrohydrocortisone.

(b) *Isolation of $\Delta^{1,4}$-pregnadiene-11β,17α,21-triol-3,20-dione.*—The filtrate including washings (about 2 liters from a fermentation which has been supplemented with 450 mg. of hydrocortisone) is extracted with four 500-ml. portions of chloroform. The combined chloroform extracts are evaporated to dryness in vacuo, and the residue is washed with hexane and recrystallized from 95% ethanol to give a pure crystalline product identical with authentic $\Delta^{1,4}$ - pregnadiene - 11β,17α,21 - triol-3,20-dione (prednisolone).

EXAMPLE 3

*9α-fluoro-$\Delta^{1,4}$-pregnadiene-11β,17,21-triol-3,20-dione*

(a) *Fermentation.*—Following the procedure of section (a) of Example 1, but substituting 9α-fluorohydrocortisone for the 11α-hydroxyprogesterone, there is obtained a filtrate containing 9α-fluoro-1-dehydrohydrocortisone.

(b) *Isolation of 9α-fluoro-$\Delta^{1,4}$-pregnadiene-11β,17α,21-triol-3,20-dione.*—The filtrate including washings (about 2 liters) is extracted with four 500-ml. portions of methyl isobutyl ketone and the combined methyl isobutyl ketone extracts are evaporated to dryness in vacuo. The residue is leached with chloroform. Recrystallization of the residue from methanol yields pure 9α-fluoro-$\Delta^{1,4}$-pregnadiene-11β,17α,21-triol-3,20-dione, identical with an authentic sample.

EXAMPLE 4

$\Delta^{1,4}$-*pregnadiene-17α,21-diol-3,20-dione*

By substituting Reichstein's Compaund S ($\Delta^4$-pregnene-17α,21-diol-3,20-dione) for the 11α-hydroxyprogesterone in the procedure of Example 1, there is obtained $\Delta^{1,4}$-pregnadiene-17α,21-diol-3,20-dione, identical with an authentic sample.

EXAMPLE 5

$\Delta^{1,4}$-*pregnadiene-17α,21-diol-3,11,20-trione*

Following the procedure of Example 2, but substituting cortisone for the hydrocortisone, there is obtained $\Delta^{1,4}$-pregnadiene-17α,21-diol-3,11,20-trione, identical with an authentic sample of prednisone.

EXAMPLE 6

$\Delta^{1,4}$-*pregnadiene-11β,17α,21-triol-3,20-dione 21-acetate*

Following the procedure of Example 2, but substituting hydrocortisone acetate for the hydrocortisone, there is obtained $\Delta^{1,4}$-pregnadiene-11β,17α,21-triol-3,20-dione 21-acetate, identical with an authentic sample.

Similarly *Bacterium cyclo-oxydans* can be used to convert other hydroxylated steroids of the 3-keto-$\Delta^4$-pregnene series and particularly the hydroxylated progesterone series to their 1-dehydro derivatives (e. g., hydroxylated 1-dehydroprogesterones).

The invention may be variously otherwise embodied within the scope of the appended claims.

We claim:
1. A process for preparing a hydroxylated steroid of the 3-keto-$\Delta^{1,4}$-pregnadiene series, which comprises subjecting a hydroxylated steroid of the 3-keto-$\Delta^4$-pregnene series to the actions of enzymes of *Bacterium cyclo-oxydans* in the presence of oxygen and recovering the resulting dehydrogenated steroid.

2. The process of claim 1, wherein the steroid reactant is a hydroxylated progesterone.

3. The process of claim 1, wherein the steroid reactant is 11α-hydroxyprogesterone.

4. The process of claim 1, wherein the steroid reactant is hydrocortisone.

5. The process of claim 1, wherein the steroid reactant is 9α-fluorohydrocortisone.

6. The process of claim 1, wherein the steroid reactant is Reichstein's Compound S.

7. The process of claim 1, wherein the steroid reactant is cortisone.

References Cited in the file of this patent

UNITED STATES PATENTS

| | | |
|---|---|---|
| 2,756,179 | Fried et al. | July 24, 1956 |
| 2,776,927 | Shull et al. | Jan. 8, 1957 |